Oct. 15, 1935.  R. B. SIMNING  2,017,221
COMPOUND SPRING
Original Filed March 7, 1931   3 Sheets-Sheet 1

INVENTOR.
Roy B. Simning.
BY
Geo Stevens.
ATTORNEYS.

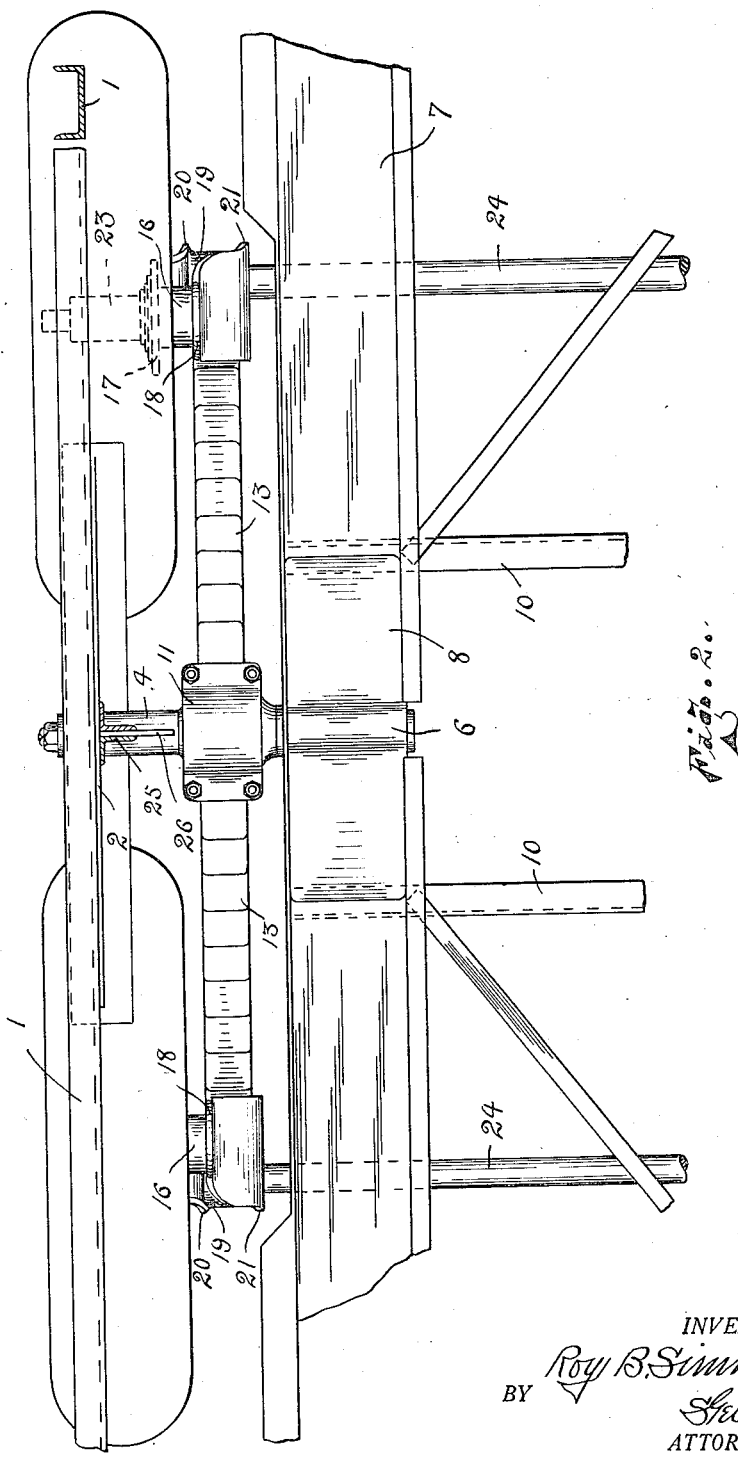

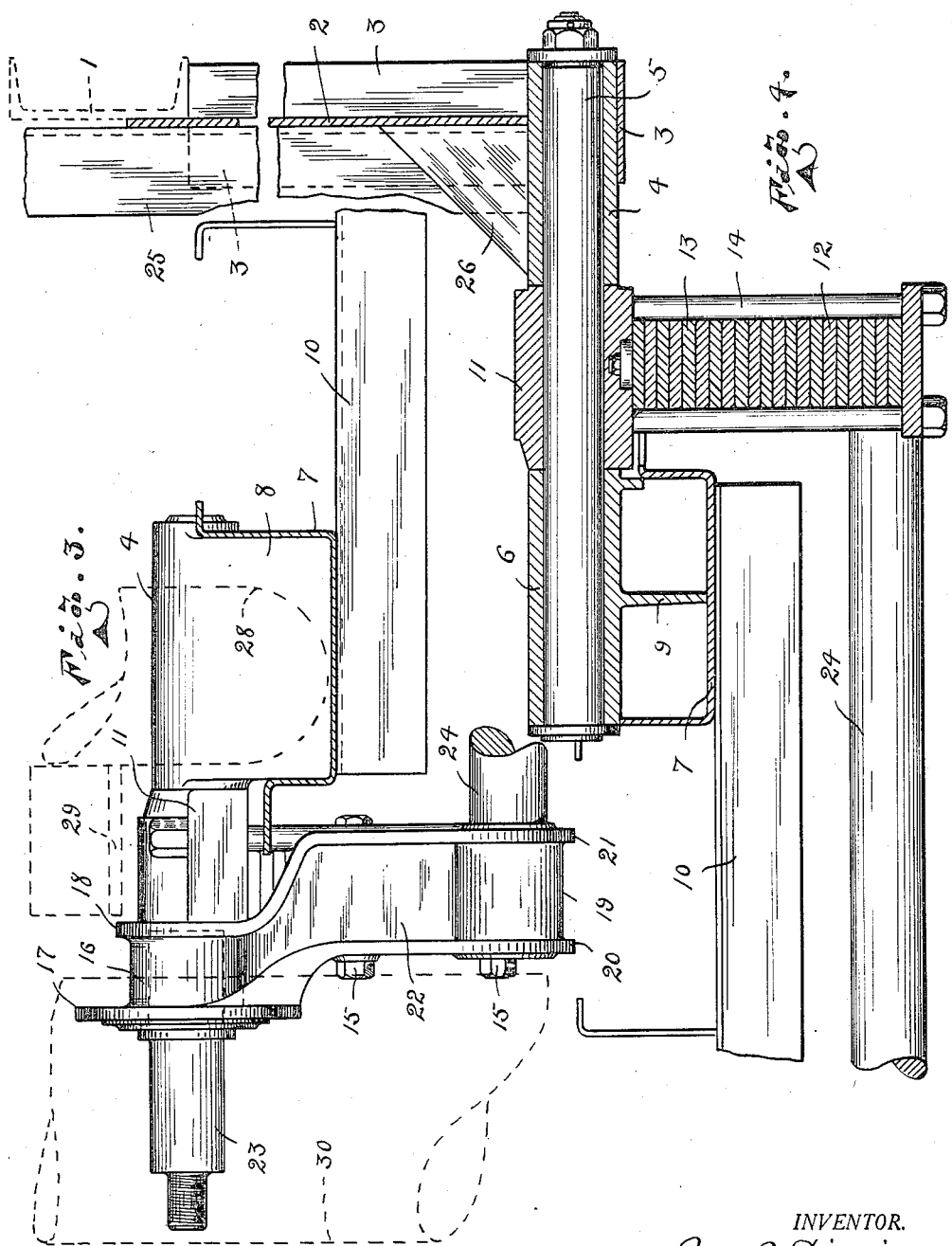

Patented Oct. 15, 1935

2,017,221

UNITED STATES PATENT OFFICE 2,017,221

COMPOUND SPRING

Roy B. Simning, Minneapolis, Minn., assignor to Motor Car Carriers, Inc., Detroit, Mich., a corporation of Michigan Substitute for abandoned application Serial No. 520,839, March 7, 1931. This application February 12, 1934, Serial No. 710,951

4 Claims. (Cl. 267—38)

This invention relates to running gear for vehicles and has special reference to what is known as a pivoting dual rear axle assembly, particularly designed for the support of the rearmost portion of a vehicle, such as a trailer or the like.

The principal object of the invention is to produce a more practical, efficient, and durable device of this character than heretofore known.

Another object is to provide a trailer and rear axle assembly which will permit of double deck loading in States where the law does not limit the height of such vehicles less than twelve feet six inches.

In some States the law prohibits the use of a vehicle, such as a trailer or the like, from exceeding ninety-six inches in overall width, and for the trailer to carry the average automobile, it must have a clear space of seventy-five inches between the wheels and at a point seven inches above the lower level of the track upon which the automobile stands. To carry the weight of the trailer and its load, were a single axle used, a tire of not less than twelve inches in diameter would be required on each wheel, which would preclude any possibility of a seventy-five inch clearance between the tires, but by using a four wheeled or dual rear axle, a tire of eight inch diameter on each wheel would properly carry the load and allow the seventy-five inch clearance, provided the axle construction itself does not interfere. It is therefore another object of the invention to provide a pivoting dual rear axle assembly having a clearance of at least seventy-five inches in overall width and yet permit of sufficient tire capacity to carry the weight.

Still another object is to provide a novel assembly of dual spring requiring the minimum lateral dimension and one functioning as a stabilizing element in connection with the drop axle assembly.

Other objects and advantages of the invention will appear in the following description thereof.

Referring now to the accompanying drawings, forming part of this application, which represent one embodiment of the invention as applied to an open fabricated highway trailer such as used in the transportation of automobiles:

Figure 2 is a top plan view of Figure 1 showing the dual axle wheels in position:

Figure 3 is an enlarged end elevation of one of the drop axle hangers: and

Figure 4 is a broken vertical central section through one of the auxiliary supporting axles.

Figure 1:
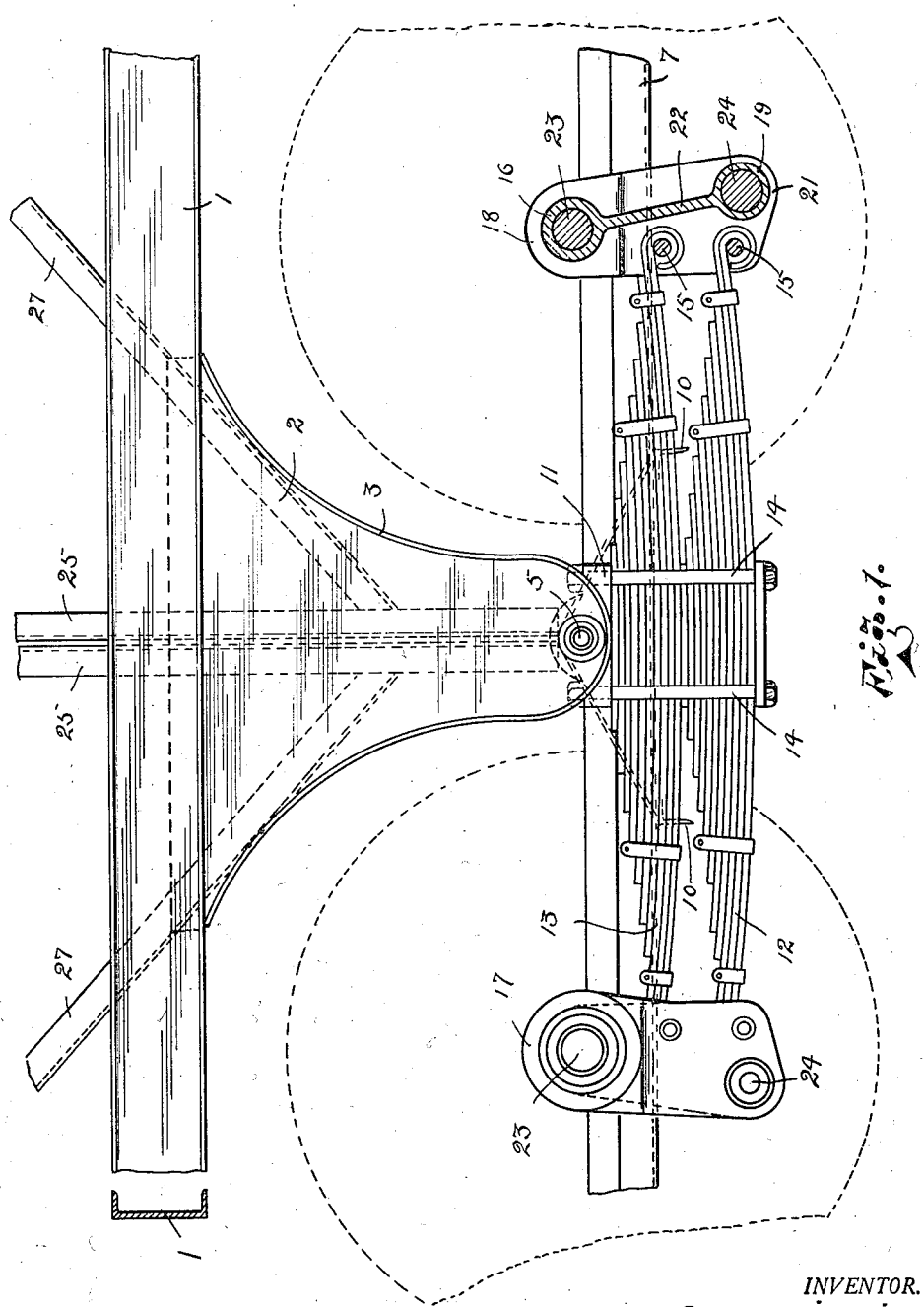
Figure 1 is a side elevation of one of the dual axle assemblies as applied to the trailer with the wheels removed and showing one of the hangers in section.

The vehicle herein illustrated is of the open frame-like fabricated structure comprising two principal supporting longitudinally disposed beams 1, which are preferably of standard channel, the uprights, transverse members, and bracing members being directly or indirectly attached thereto, but the specific arrangement of which forms no part of my present invention.

The channels 1 however are each disposed substantially directly above the innermost load carrying wheels of the vehicle as clearly illustrated in Figures 1 and 2 of the drawings. These channels are spaced above the wheels so as to give sufficient clearance in allowing for spring action and oscillation of the dual axle assembly and are each provided with a depending plate bracket indicated at 2, disposed centrally between the wheels as viewed from the side thereof, and the upper edge of which is preferably made to overlap the back of its respective channels. Each bracket is provided with a reinforcement about the marginal edge thereof consisting of a narrow plate 3 welded thereto and extending wholly about same beneath the channel 1, thus forming a flange-like projection upon either side thereof and which plate extends below and around the hub 4 upon the auxiliary supporting axle 5. It will be noted that this assembly is novel in that it is designed for the support of a vehicle used for carrying other smaller vehicles, or automobiles, thus requiring the maximum clearance intermediate the pairs of traction wheels, necessitating the removal of the central portion of the auxiliary supporting or pivot axle, so that, as before stated, it is composed of two separate short pivot axles one upon either side. As one of the objects of the present invention is to maintain the wheel gauge of the carrying vehicle as nearly as possible to the standard gauge of the vehicles being carried, the hub-like support 6 for the inner end of the auxiliary supporting or pivot axle 5 is accomplished by the utilization of the runway channel 7 for the vehicle being carried which passes a spaced distance beneath the auxiliary axle 5, but at the junction therewith is provided with the double inclined filler plate 8 forming a runway over the hub 6, and this latter is provided with a depending web 9 beneath the inclined runway 8 for adding strength to the assembly, which is preferably united as by welding. Two spaced transverse angle bars 10 are installed beneath the channels 7 upon either side of the vehicle, firmly tieing same together upon either side of the auxiliary supporting axle, these angles preferably occurring just beneath the juncture of each inclined wall of the member 8 with the bottom of the channel.

Intermediate the hubs 4 and 6 of each auxiliary axle is installed the spring pivot block 11, beneath each one of which is installed the pair of multi-leaf springs 12 and 13, they being held tightly against the under side of the block by the two pairs of bolts 14, as is usual in such installations. It will be noted that the springs 12 and 13 are in the nature of a composite spring, or two springs in one, which will permit a narrow spring to be used and yet provide sufficient strength to support the load and at the same time act as radius rods to hold the offset hangers in their proper position vertically. Furthermore the springs are suspended at a point below the level of the hubs of the wheels in such a manner as to permit the pivot axle to be located under the point required for clearance of the running boards of the vehicles carried, and, while thus providing the necessary pivotal connection for the springs insures each hanger against abnormal rocking motion longitudinally of the vehicle, and the drop axle, wheel axle, and spring connections, being in the single hanger member, insures proper relation of the parts at all times.

The ends of each pair of springs are pivotally mounted as at 15 intermediate the side walls of a drop axle hanger, there being one for each load carrying wheel of the vehicle. These hangers are peculiar in their construction in that they are materially offset, that is to say, the lowermost end extends inwardly towards the center of the vehicle from a medial vertical line through the hanger, while the uppermost portion extends outwardly of said medial line. This staggered or offset relation of the two extremities of the hanger is for the purpose of providing sufficient clearance during the oscillation of the assembly while in use. Each hanger comprises an uppermost hub portion 16 having spaced flanges 17 and 18 at the opposite ends thereof, and a lower hub portion 19 with flange-like extensions 20 and 21 upon either end thereof. Intermediate these hub portions and the flanged side members is formed integrally therewith the reinforced centrally disposed web 22.

Within the uppermost hub 16 is installed in any desired manner the stub wheel spindle or axle 23, while within the hub 19 of the hanger is installed the end of the drop axle rod or shaft 24 which extends transverse beneath the vehicle and its opposite end similarly fixed to the companion hanger on the opposite side of the vehicle resulting in there being a pair, one at the forward end and the other at the after end of each dual axle assembly.

At 25 are illustrated two angle bars placed back to back and extending downwardly to the hub 5 and just above which carry between them the corner or gusset plate 26 for reinforcement; these angle bars being part of the upright support for the superstructure of the vehicle. As further strengthening means for the depending bracket 2 I have shown two of the bracing angles 27 as terminating from opposite directions at the angle bars approximately centrally of the bracket 2.

At 28 in Figure 3 of the drawings is illustrated the relative position of the wheels of a large automobile being carried over the pivotal connection 5 of the carrying vehicle frame to the dual axle assembly and at 29 is shown the position of the running board of such carried vehicle, while in dotted lines at 30 is represented the relative position of the dual axle assembly wheels.

From the foregoing it is evident that I have devised a novel form of dual drop axle assembly for vehicles, giving the greatest amount of clearance intermediate the wheels and yet in no way detracting from the practical operation of same; in fact the drop axle feature being underslung in conjunction with the offset hangers gives freedom to the independent action of the wheels not found in the ordinary dual axle assembly.

Having thus described my invention, what I claim and desire to secure by Letters Patent, is:

1. A compound spring for dual drop axle assemblies of the character described including spaced wheel-spindles, hangers depending from said spindles, cross rods supported in the lower ends of said hangers, two groups of graduated leaf spring members rigidly held together in abutting relation centrally, said compound spring being pivotally united centrally to load supporting means, each pair of adjacent termini of said spring groups being pivotally fixed within one of said hangers.

2. A compound vehicle spring for dual drop axle assemblies comprising a pair of similarly shaped groups of spring leaves, means whereby both groups and all of the leaves are abuttingly united intermediate the ends thereof, means for pivotally supporting said compound spring centrally, a wheel spindle at each end of the spring, and unitary means depending from each spindle, uniting the groups below the spindle, and holding them against independent longitudinal movement.

3. A compound spring for dual drop axle assemblies comprising spaced resilient members normally parallel with each other and having spaced termini at each end thereof, means for rigidly holding and pivotally supporting the members in non-spaced relation centrally, a wheel spindle at each end of the spring, and single rigid means depending from the wheel spindle at each end of the spring for pivotally connecting a pair of spaced termini thereof to prevent independent longitudinal movement, and means in the lower portion of each hanger for attachment of a cross rod of a drop axle.

4. A compound spring for dual drop axle assemblies of the character described including wheel spindles, hangers depending from the wheel spindles, a transverse cross rod supported in the lower end of each hanger, two groups of graduated leaf spring members rigidly held together in abutting relation centrally and in spaced relation at their termini, and means for pivotally supporting the adjacent termini of both groups of spring members within a hanger below the spindle to prevent independent longitudinal movement of said groups.

ROY B. SIMNING.

CERTIFICATE OF CORRECTION.

Patent No. 2,017,221.

October 15, 1935.

ROY B. SIMNING.

It is hereby certified that error appears in the above numbered patent requiring correction as follows: In the grant, line 3, the name of the assignee was erroneously described and specified as "Motor Carriers, Inc." whereas said patent should have been issued to Motor Car Carriers, Inc., of Detroit, Michigan, a corporation of Michigan; strike out present line 14, and insert Motor Car Carriers, Inc., its successors or assigns; and that the said Letters Patent should be read with this correction therein that the same may conform to the record of the case in the Patent Office.

Signed and sealed this 10th day of December, A. D. 1935.

Leslie Frazer
Acting Commissioner of Patents.

(Seal)